United States Patent [19]
Takahashi et al.

[11] Patent Number: 5,987,569
[45] Date of Patent: *Nov. 16, 1999

[54] MEMORY CONTROL APPARATUS AND METHOD FOR CONTROLLING USAGE AMOUNTS FOR A PLURALITY OF CACHE MEMORIES

[75] Inventors: Misako Takahashi; Yoshihiro Asaka; Shigeru Kishiro, all of Odawara; Akira Yamamoto, Sagamihara, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/601,358

[22] Filed: Feb. 16, 1996

[30] Foreign Application Priority Data

Feb. 20, 1995  [JP]  Japan .................................. 7-030435

[51] Int. Cl.[6] .............................. G06F 13/00; G06F 13/38
[52] U.S. Cl. .......................... 711/119; 711/114; 711/113; 711/157
[58] Field of Search ..................................... 395/439, 440, 395/441, 484, 470, 489; 711/112, 113, 114, 143, 157, 162, 120, 119

[56] References Cited

U.S. PATENT DOCUMENTS

| | | | |
|---|---|---|---|
| 4,458,310 | 7/1984 | Chang | 711/119 |
| 5,418,929 | 5/1995 | Tsuboi et al. | 711/143 |
| 5,568,628 | 10/1996 | Satoh et al. | 711/113 |
| 5,640,530 | 6/1997 | Beardsley et al. | 711/162 |

OTHER PUBLICATIONS

*IBM Systems Journal,* "Evolution of the DASD Storage Control", C.P. Grossman, vol., 28, No. 2, 1989.

*Primary Examiner*—Glenn Gossage
*Attorney, Agent, or Firm*—Antonelli, Terry, Stout & Kraus, LLP

[57] ABSTRACT

A memory control apparatus interposed between a central processing unit and a memory device to store data includes a channel control unit to control a data transfer to/from the central processing unit; a drive control unit to control a data transfer to/from the memory device; a plurality of cache memories to temporarily store data which is transferred between the central processing unit and the memory device; and a cache memory control unit having a selector for selecting a cache memory to store data which is transferred from the memory device. The memory control apparatus selects a cache memory to which data is to be stored so as to almost equalize usage of the plurality of cache memories, thereby controlling allocation of the cache memories and enabling a cache memory space to be effectively used.

6 Claims, 7 Drawing Sheets

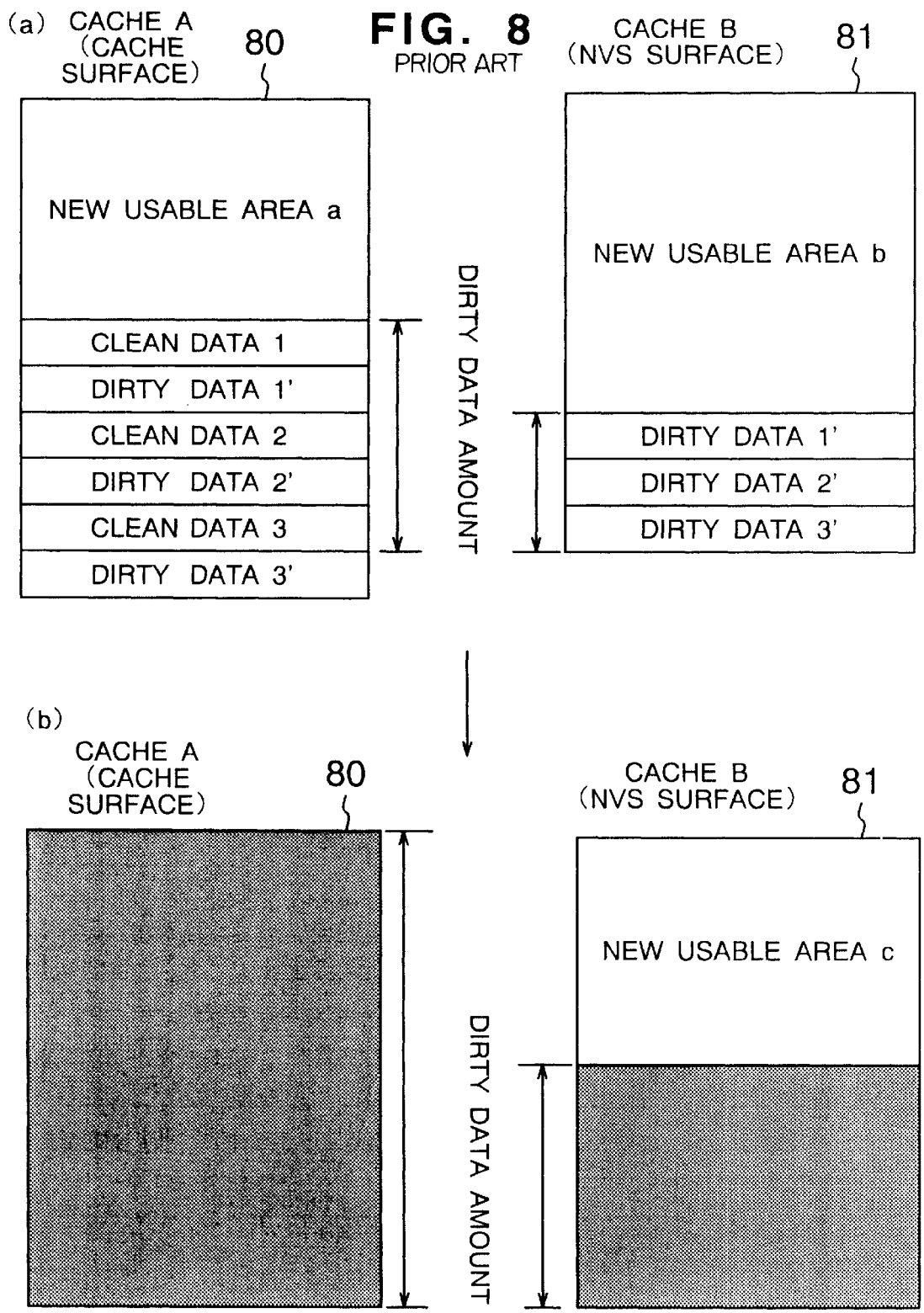

MEMORY CONTROL APPARATUS AND METHOD FOR CONTROLLING USAGE AMOUNTS FOR A PLURALITY OF CACHE MEMORIES

BACKGROUND OF THE INVENTION

The invention relates to an information processing system including a memory device and a memory control apparatus having a plurality of cache memories and, more particularly, to a memory control apparatus of an information processing system in which a memory device uses a Redundant Array of Inexpensive Disks (RAID) technique.

In a conventional memory control apparatus having a cache memory, in response to a write instruction from a central processing unit, completion of a writing process is reported to the central processing unit when write data has been stored into the cache memory in the memory control apparatus. The storage of the write data into a disk device is executed by the memory control apparatus asynchronously with the write instruction from the central processing unit. Such a control is called a write-after control. In the write-after control, when the end of writing process is reported to the central processing unit, since data is not transferred to the disk device, a high-speed response to the central processing unit can be performed.

In the data stored in the cache memory, the data before it is transferred to the disk device is called dirty data, and the data which coincides with the data in the disk device is called clean data. In an information processing apparatus for performing the write-after control, dirty data is data which exists only on the cache memory in the memory control apparatus. Therefore, the dirty data cannot be deleted until the transfer to the disk device is finished.

Data transfer speed between the cache memory and the disk device is slower than data transfer speed between the central processing unit and the cache memory. There is consequently, a case where the cache memory is filled with the dirty data at the time of the write-after control. Therefore, a memory control apparatus disclosed in JP-A-4-264940 monitors an amount of dirty data in the cache, an inflow amount of write data to the cache memory of each memory device, and an outflow amount of dirty data due to the write-after process. When the dirty data amount in the cache reaches a certain threshold value (permission amount), a limitation of the allocation of the cache memory to the write data and a data writing preferential execution to the memory device are executed for the memory device in which (the inflow amount)>(the outflow amount). Due to the above control, a deterioration in performance of the whole system caused by the cache memory entering a full state is avoided and the distribution of the allocation of the cache memory for every memory device can be properly performed.

In the write-after process, since the cache memory is volatile, there is a possibility that the dirty data is deleted due to a fault of a power source of a control apparatus or the like, a fault of a hardware of the cache memory, or the like. Therefore, in "Evolution of the DASD storage control" disclosed in IBM SYSTEMS JOURNAL, Vol. 28, No. 2, 1989, a memory control apparatus has therein a cache memory and a non-volatile storage (NVS) of a small capacity for backup of dirty data, and the dirty data is duplexed and held in the cache memory and non-volatile storage (NVS), thereby preventing deletion of the dirty data.

Further, a memory control apparatus having a plurality of cache memories which is backed up by a battery is disclosed in JP-A-5-189314. The memory control apparatus has a cache memory whose power source is depleted by a battery backup. The cache memory is divided into N portions and data read out from a memory device by a command from an upper apparatus is stored into an arbitrary one of the N divided portions of the cache memory. Data which is written into the cache memory by an instruction from the upper apparatus is stored into two arbitrary ones of the N divided portions of the cache memory. Thus, performance of the data at the time of a fault is improved and a deterioration of the performance can be prevented.

When using the RAID technique for the disk device as a memory device, the memory control apparatus needs to form parity data to guarantee data at the time of the write-after process. Therefore, both the dirty data (write data) and the clean data (data which is updated by the write data) need to be held on the cache memory.

In the memory control apparatus disclosed in JP-A-5-189314 in which data is duplexed and stored into a plurality of cache memories, the amount of data which cannot be deleted until the data transfer to the disk device is completed is largely divided between the depleted cache memories depending on an allocating method of the cache memory for the clean data. When an amount of dirty data (including the clean data to form parity data) in one cache memory reaches a cache memory capacity or a preset dirty data threshold value (permission amount), even in the case where there is a usable area in the other cache memory, the dirty data cannot be duplexed. Thus, a response by the write-after process cannot be performed and the performance deteriorates.

FIG. 8 shows a case where a cache surface (cache for storing clean data and dirty data as updated data of the clean data) and an NVS surface (cache to store the dirty data) of each of a cache A 80 and a cache B 81 of a memory control apparatus are fixedly used.

When using one of the two cache memories as a cache surface and the other as an NVS surface, as shown in FIG. 8(a), an amount of dirty data in the cache A 80 that is used as a cache surface is larger than an amount of dirty data in the cache B 81 that is used as an NVS surface. Thus, as shown in FIG. 8(b), when the cache A 80 which is used as a cache surface is filled with the dirty data, in spite of the fact that a new usable area c still remains in the cache B 81, the dirty data cannot be duplexed. Therefore, the write-after process cannot be performed.

SUMMARY OF THE INVENTION

An object of the invention relates to an allocation of cache memories and intends to improve the efficiency using or allocating of cache memory space by controlling a balance of using states of a plurality of cache memories.

To accomplish the above object, a memory control apparatus according to the invention comprises: a channel control unit, interposed between a central processing unit and a memory device for storing data, for controlling a data transfer to/from the central processing unit; a drive control unit for controlling data transfer to/from the memory device; a plurality of cache memories for temporarily storing data that is transferred between the central processing unit and the memory device; and a cache memory control unit having selecting means for selecting the cache memory to store data which is transferred from the memory means. The selecting means arbitrarily selects a first cache memory which is used as a cache surface and a second cache memory which is used as an NVS surface from among a plurality of cache memories. There is a case where the cache memory control unit of the memory control apparatus has memory means for storing control information of the memory control apparatus.

When the data is read out from the memory device, the memory control apparatus transfers the read data to the central processing unit and stores the data in the cache memory. In this instance, a memory control apparatus arbitrarily selects the cache memory, which is used as a cache surface (a cache for storing clean data and dirty data which is updated data of the clean data) from a plurality of cache memories, and stores the data in the selected cache memory.

When the data is written into the memory device, on the other hand, the memory control apparatus stores the write data transferred from the central processing unit into the cache memory. In this instance, when the data which is updated by the write data has been stored as clean data in the cache memory, the cache memory is used as a cache surface, and clean data and dirty data which is updated data of the clean data are stored in the cache surface. The memory control apparatus arbitrarily selects the cache memory which is used as a non-volatile storage (NVS) surface from a plurality of cache memories and stores the dirty data into the cache memory.

As a specific method for when the memory control apparatus selects the cache memory, there is a method of selecting a cache memory on the basis of a virtual or physical address or an identifier of data such as a sequence number or the like when dividing into management units.

There is another method including the steps of: storing usable/unusable state information of each of the unit memories included in the cache memory into the control memory of the memory control apparatus; and calculating the number of usable unit memories of each of the cache memories with reference to the usable/unusable state information of each of the unit memories, and wherein the cache memory is selected by the usable unit memory.

There is yet another method including the steps of: storing memory usage amount information for each of the cache memories into the control memory of the memory control apparatus; arbitrarily selecting the first cache memory and the second cache memory from a plurality of cache memories on the basis of the memory usage amount information of each of the cache memories; and storing dirty data amount information for each of the cache memories or clean data amount information to form parity data in the control memory, and wherein the cache memory is selected on the basis of the dirty data amount information of each of the cache memories or the clean data amount information to form the parity data.

According to the invention, when data is read out from the memory device, the memory control apparatus selects the cache memory which is used as a cache surface from a plurality of cache memories and stores the read data as clean data into the selected cache memory. When updating the clean data, the memory control apparatus selects the cache memory which is used as an NVS surface from the plurality of cache memories and stores the write data into each of the cache memories which are used as a cache surface and an NVS surface. In this instance, the clean data stored in the cache memory that is used as a cache surface is also held in the cache memory.

As mentioned above, the memory control apparatus according to the invention arbitrarily selects the cache memories to be used as a cache surface and an NVS surface from the plurality of cache memories. Therefore, a deviation of the using states among the plurality of cache memories can be reduced.

When the memory control apparatus selects the cache memory on the basis of an address of the data or a sequence number of the data, the data of a certain group unit having certain characteristics is divided and allocated into the plurality of cache memories by the address or sequence number of the data. Therefore, expected values of probabilities at which the data in the cache memory is updated are averaged among the plurality of cache memories and a cache memory space can be effectively used. That is, the probability of the data to be updated differs depending on the characteristics of the data. Therefore, by allocating a group of data to the same cache memory, the occurrence of a deviation of the dirty data amounts among the plurality of cache memories in accordance with the data characteristics is prevented, so that which cache memory is allocated to the divided data is decided by an identifier of the data.

When the memory control apparatus selects the cache memory on the basis of the number of requests for the allocation of the cache memory, the memory control apparatus has means for storing the number of processes by the cache memory selecting process or the number of blocks allocated to the control memory. The memory control apparatus selects the cache memory on the basis of the number of processing times or the number of blocks. Therefore, since the probability values at which the data in the cache memory is updated are averaged among the plurality of cache memories, the cache memory space can be effectively used.

Further, when the memory control apparatus selects the cache memory on the basis of the cache memory using state, the memory control apparatus has means for storing the using state information of each of the plurality of cache memories in the control memory. The memory control apparatus selects which cache memory is allocated in accordance with the using state of the cache memory. According to the above control method, by averaging the present using states of the cache memories, the cache memory space is effectively used.

On the other hand, the cache memory in the memory control apparatus of the invention includes a plurality of unit memories and can close every unit memory. When a certain unit memory is closed, the cache memory including the closed unit memory is called a degenerate state. When there is a cache memory in the degenerate state, a balance of the capacities among the plurality of cache memories is divided. Therefore, it is necessary to control the memory allocation in consideration of a capacity ratio of the cache memory. For this purpose, the memory control apparatus has means for storing the closed state information of each unit memory as a component element of the plurality of cache memories, calculating the capacity of each cache memory by the closed state information, and selecting the cache memory to be allocated in accordance with a capacity ratio. In this instance, the above method can be also commonly used.

BRIEF DESCRIPTION OF THE DRAWINGS

FIG. 8 is an explanatory diagram of a prior art construction of the subject matter of the invention.

DESCRIPTION OF THE PREFERRED EMBODIMENTS

An embodiment of the invention will now be described hereinbelow with reference to the drawings.

Figure 1:
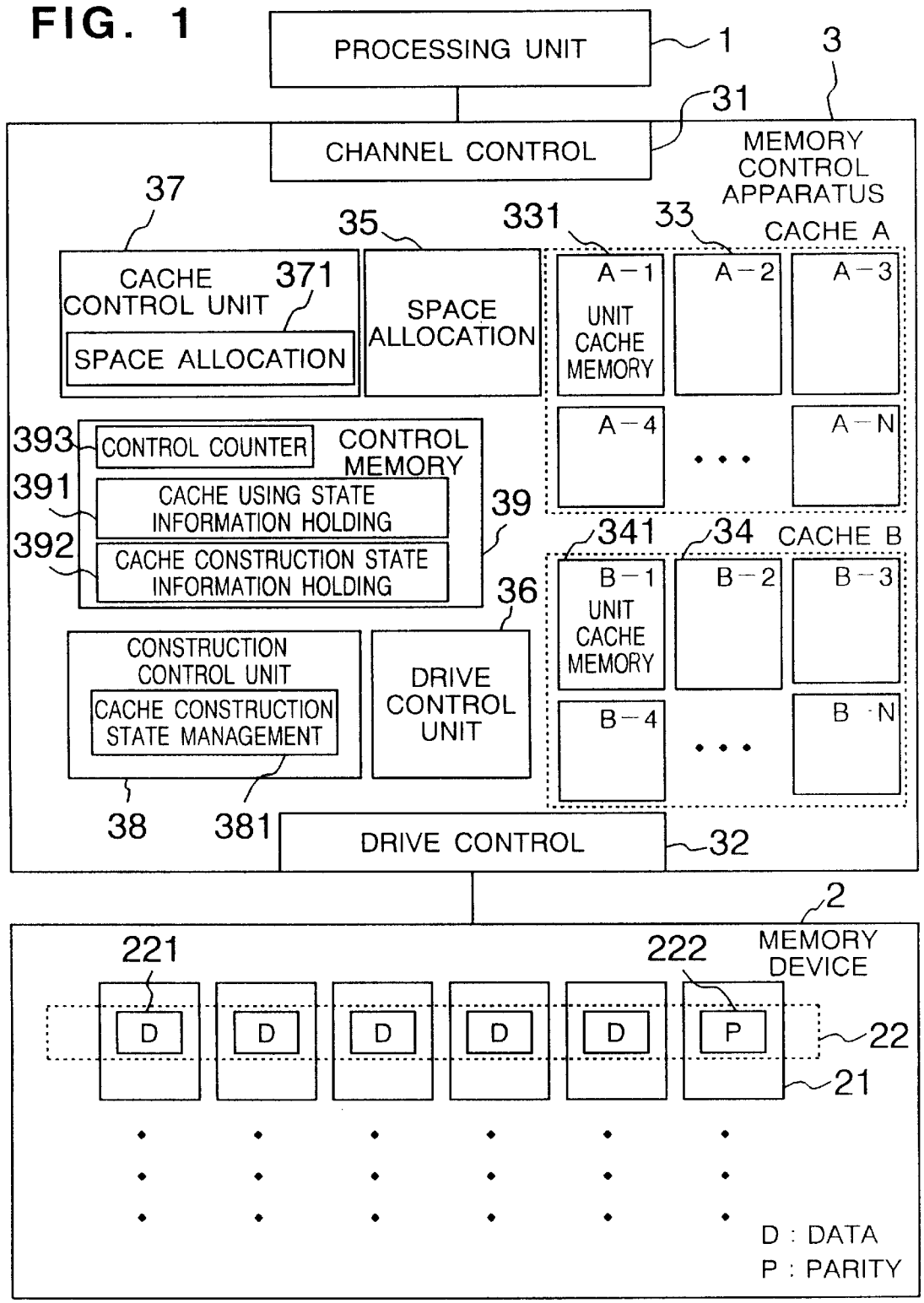
FIG. 1 shows an information processing system according to an embodiment of the invention.

FIG. 1 shows an information processing system according to an embodiment of the invention. The information processing system has a processing unit (CPU 1), a memory device 2, and a memory control apparatus 3 connected to the processing unit 1 and memory device 2.

The memory control apparatus 3 is connected to the processing unit 1 through a channel control 31 and is connected to the memory device 2 through a drive control 32. Further, the memory control apparatus 3 includes therein: non-volatile cache memories A 33 and B 34 which are made non-volatile by a battery power source; a space allocation unit 35; a drive control unit 36; a cache control unit 37; a construction control unit 38; and a control memory 39.

A construction of the memory device 2 and an 25 outline of a flow of data will now be described. The memory device 2 includes a disk array having a plurality of disk devices 21. In the disk array, data 22 is divided and divided data 221 is stored into the other different disk devices 21, respectively. Data (parity data) to guarantee the data is formed by the divided data 221 and is stored into the disk device 21 different from the disk device in which the data 221 was stored.

In the embodiment, the divided data 221 is managed on a slot unit basis. The "slot" includes a plurality of records and is a unit which is managed by a unique number called a slot number. A state in which the data corresponding to a read request and a write request issued from the processing unit 1 already exist in the cache memory A 33 or B 34 is referred to as a read hit and a write hit, respectively. On the contrary, a state in which the requested data does not exist in the cache memory is referred to as a read miss and a write miss, respectively. In the cache memory, data which coincides with the data in the memory device 2 is called clean data. In the cache memory, updated or modified data which is not stored in the memory device 2 but has been stored in only the cache memory is called dirty data.

When the read request for the data 22 in the memory device 2 is issued from the processing unit 1, the data is read out by each disk control unit and, after that, the data 22 is stored in the cache memory A 33 or B 34.

When the write request for the memory device 2 is issued from the processing unit 1, the data to be updated is read out from the memory device 2 into the cache memory at the time of the write miss. When the updated data is written into the cache memory, the memory control apparatus 3 returns a response indicative of the end of the writing process to the processing unit (write-after control). In the writing process, the data written in the cache memory becomes dirty data. The dirty data is duplexed and stored in the cache memories A 33 and B 34. In this instance, the clean data before updating which was read out from the memory device 2 is held as it is in the cache memory.

The process of writing the dirty data into the memory device 2 is executed asynchronously with the write request from the processing unit 1. New parity data is formed by the dirty data and clean data in the cache memory. The dirty data and the new parity data are written into the memory device 2. When the writing process is finished, the target data of the writing process does not need to be duplexed and held as dirty data in the cache memories. This data, accordingly, is held as clean data in either one of the two cache memories. The data can be also deleted from the chosen cache memory.

As mentioned above, the cache memory which stores the clean data and the dirty data, in which the clean data was updated, is called a cache surface and the cache memory which stores the other one of the duplexed dirty data is called an NVS surface.

Control of the memory control apparatus which is used in the invention will now be described. The cache memory A 33 is constructed by n unit cache memories (A-1, A-2, . . . , A-n) 331 which can be individually closed. A state of the cache memory including the closed cache memory unit is referred to as a degenerate state. A state of the cache memory wherein all of the unit cache memory units 331 included in the cache memory are closed is referred to as a closed state. The same shall also be similarly applied to the cache memory B 34 and unit cache memories 341.

The cache control unit 37 has means 371 for allocating the cache memory to store data when the data 15 is stored into the cache memory in association with the reading/writing process from the processing unit 1.

A construction control unit 38 manages a normal/closed state of each of the cache memory units 331 and 341 and a normal/degenerate/closed state of each of the cache memories 33 and 34, and holds cache construction state information 392 in control memory 39. The cache control unit 37 manages using states of the cache memories 33 and 34 and holds cache using state information 391 in the control memory 39.

Figure 2:
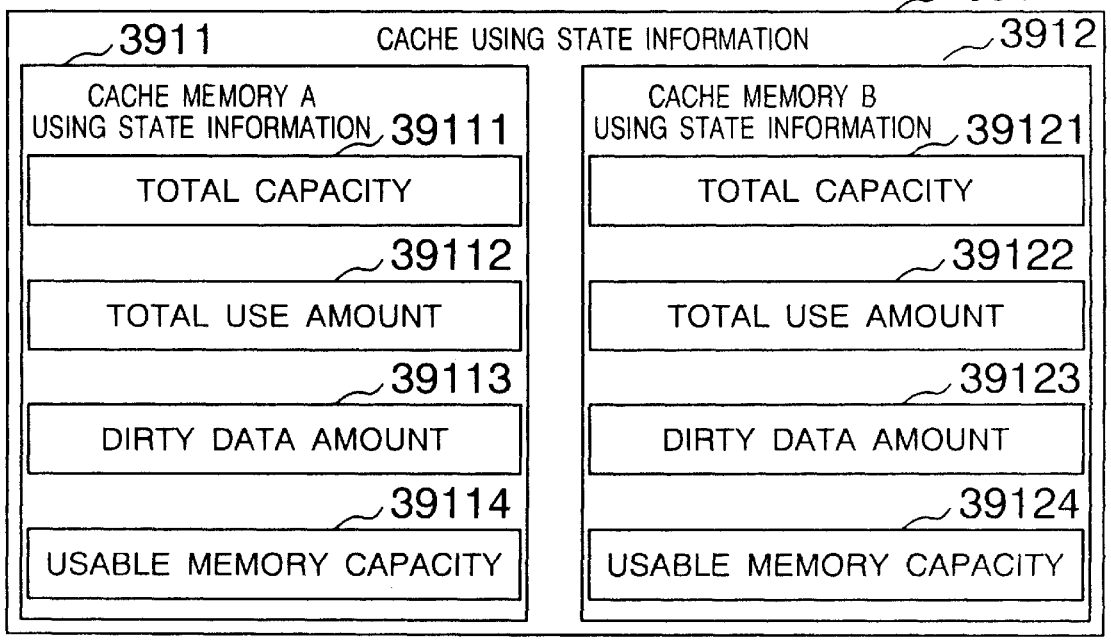
FIG. 2 shows detailed contents of a cache using 20 state information.
Figure 3:
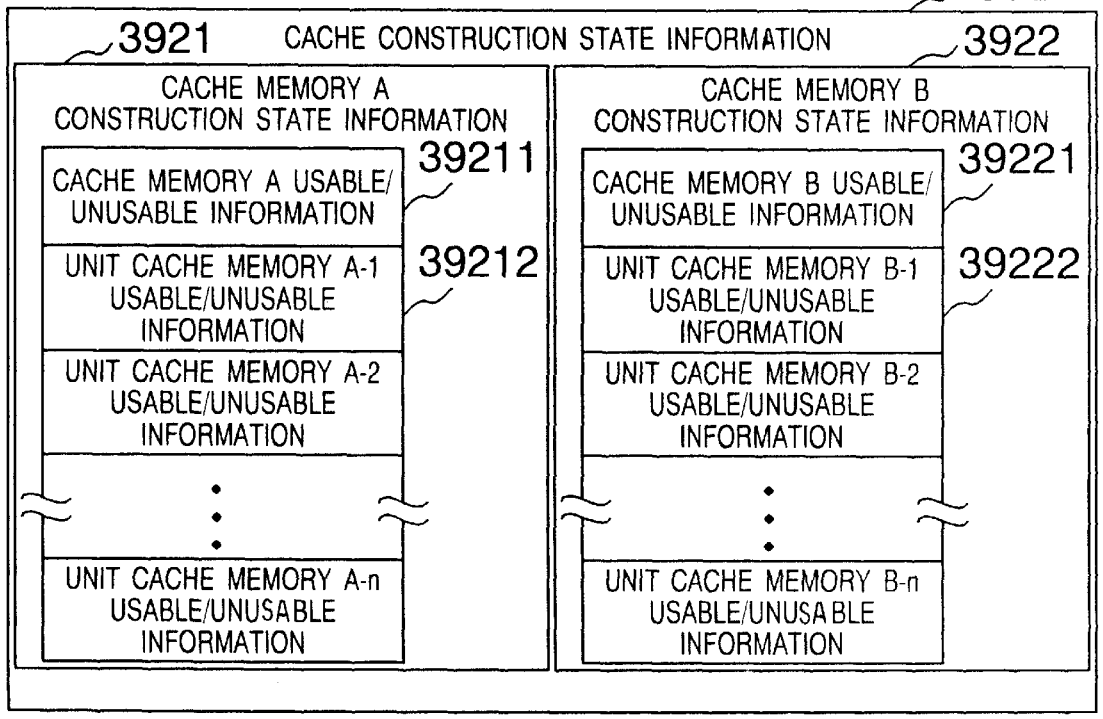
FIG. 3 shows detailed contents of cache construction state information.

FIGS. 2 and 3 show the details of the cache using state information 391 and cache construction state information 392. Usage state information 3911 of the cache memory A and usage state information 3912 of the cache memory B are included in the cache using state information 391. Total capacities 39111 and 39121, total use amounts 39112 and 39122, dirty data amounts 39113 and 39123, and usable memory capacities 39114 and 39124 are recorded in the using state information 3911 and 3912, respectively. The total capacity is a capacity of the installed cache memory. The usable memory capacity is a normal total capacity of the unit cache memory. Cache memory A construction state information 3921 and cache memory B construction state information 3922 are included in the cache construction state information 392. Cache memory usable/unusable information 39211 and 39221 and unit cache memory usable/unusable information 39212 and 39222 are held in the construction state information 3921 and 3922, respectively. Further, the number of executions of the selecting process of the cache memory of the cache surface, namely, the number of executions of the allocation of the memory for the clean data is stored into the cache memory of the cache surface by the cache control unit 37. The cache control unit 37 uses that information when the cache memories are allocated.

An example of a process for selecting the cache memory which is used as a cache surface from the cache memory A 33 or B 34 when allocating the cache memories will now be described. In the embodiment, since only two cache memories are provided, the selecting process of the NVS surface is unnecessary.

When the read request is issued from the processing unit 1 to the memory device 2, the read data is read out from the disk device and then the data 22 is stored in the cache memory selected as a cache surface by the cache control unit 37.

When the write request is issued from the processing unit 1 to the memory device 2, in case of the write miss, the cache memory which is used as a cache surface is selected by the cache control unit 37. The memory control apparatus 3 stores the updating target data which was read out from the memory device 2 into the cache memory of the cache surface, and writes the updated data into the cache memory serving as a cache surface and the other cache memory serving as an NVS surface. In case of the write hit, the dirty data, which is updated data for the clean data is stored in the cache memory of the cache surface in which the clean data has been stored with the other cache memory, saved as an NVS surface. In this instance, the clean data is held as it is in the cache memory of the cache surface.

An example of the process for selecting the cache memory that is used as a cache surface will now be described with reference to a flowchart.

Figure 4:
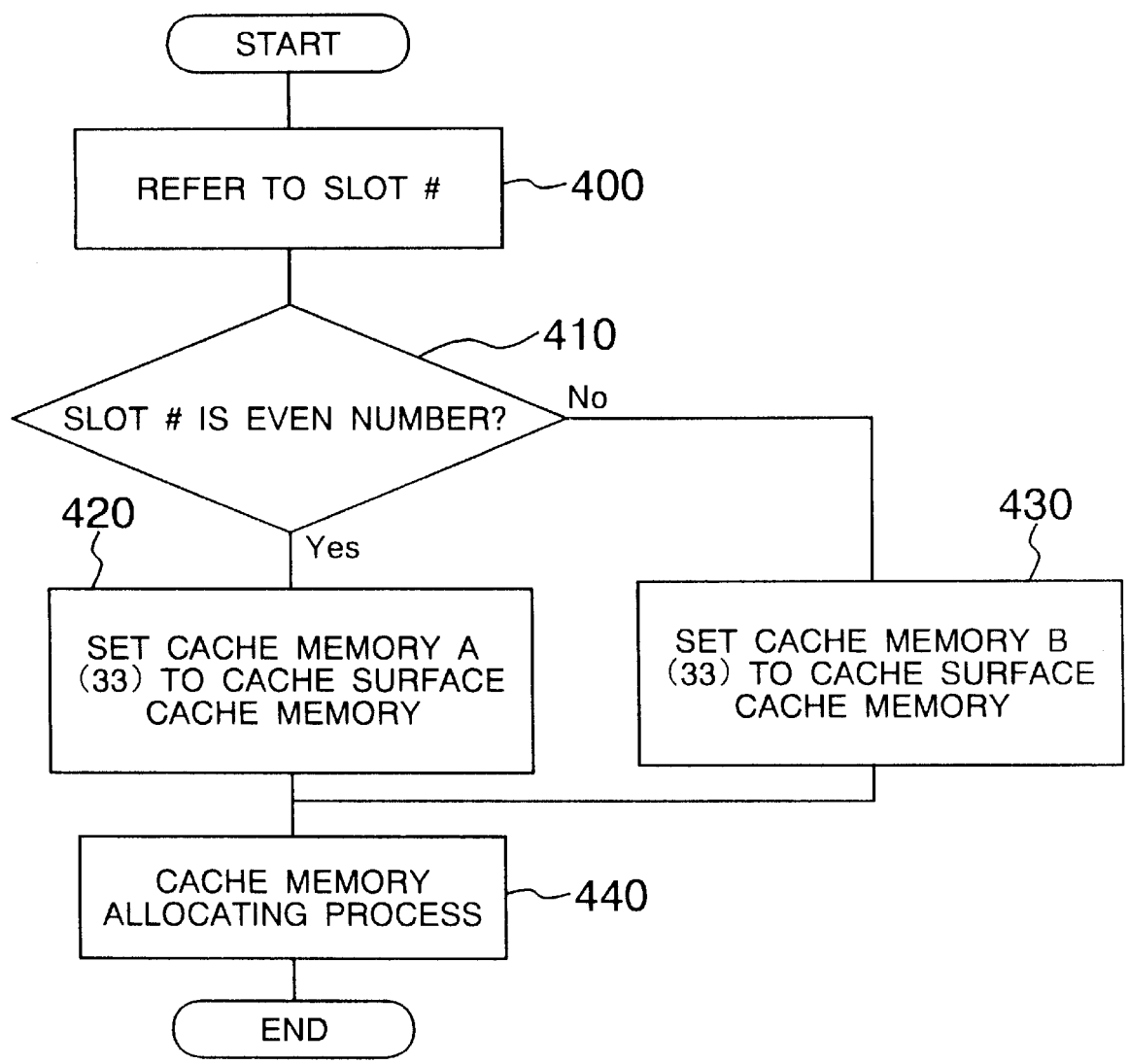
FIG. 4 shows an example of a selecting process of a cache memory of a cache surface.

FIG. 4 shows an example of the process of selecting the cache memory which is used as a cache surface. The cache control unit 37 refers to the slot number of the data which is stored in the cache memory (step 400). A check is made to see if the slot number is an even number or an odd number (step 410). When the slot number is an even number, the cache memory A 33 is selected as a cache memory which is used as a cache surface (step 420). When the slot number is an odd number, the cache memory B is selected as a cache memory which is used as a cache surface (step 430). The allocating process of the cache memories then is executed (step 440). In the example, although the above selection→determination has been made on the basis of whether the slot number is an even number or an odd number, so long as any deviation of data characteristics is small, it is also possible to distribute the cache surfaces to every slot number and to select therefrom.

Figure 5:
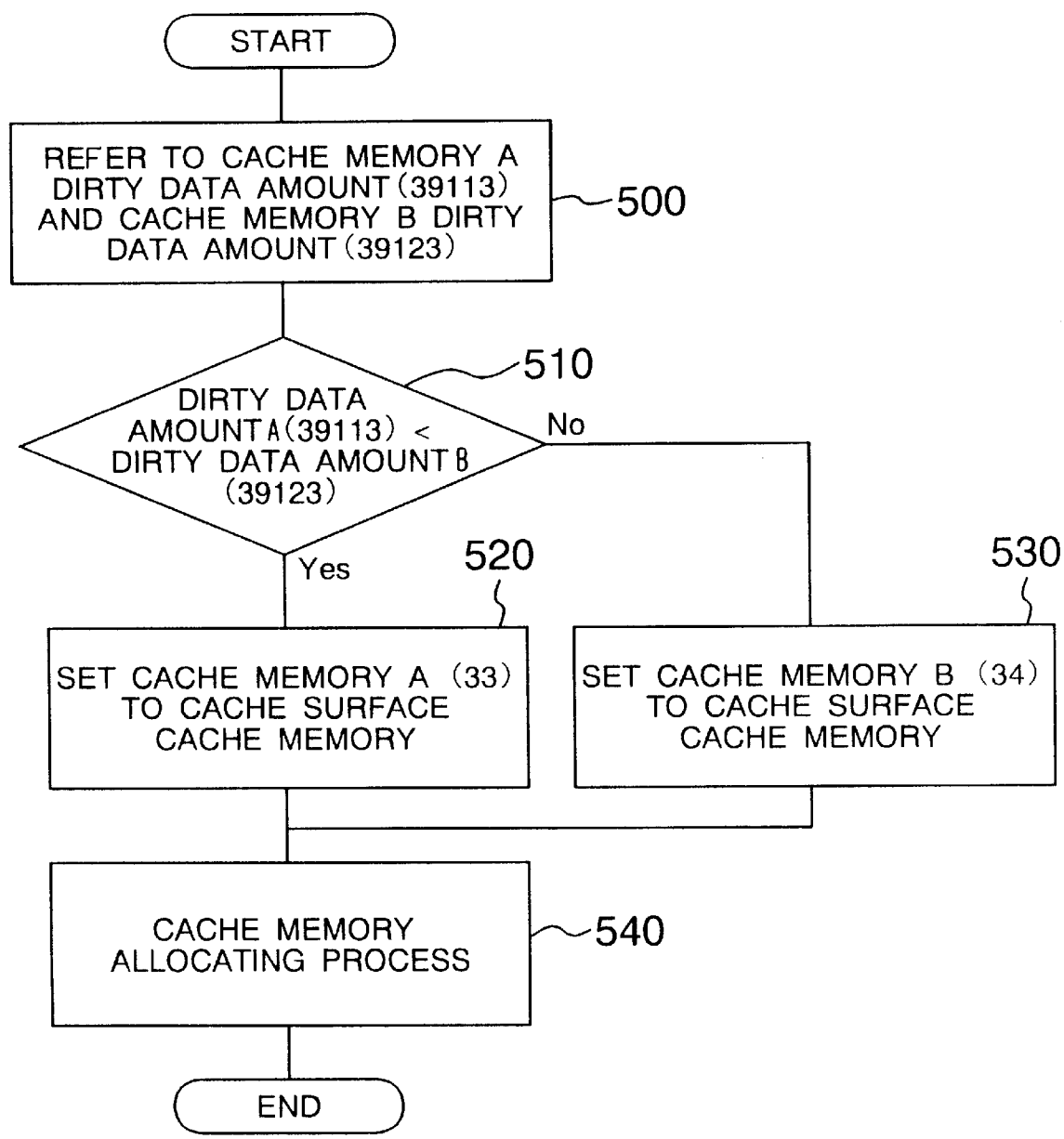
FIG. 5 shows an example of the selecting process of the cache memory of the cache surface.

FIG. 5 shows another example of the process of cache memory selecting process of the cache memory which is used as a cache surface. The cache control unit 37 refers to the cache memory A dirty data amount 39113 in the control memory 39 and the cache memory B dirty data amount 39123. The dirty data amounts 39113 and 39123 are compared (step 510). The cache memory of a smaller dirty data amount is selected as a cache memory which is used as a cache surface (steps 520, 530). The allocation of the cache memories is performed (step 540).

Figure 6:
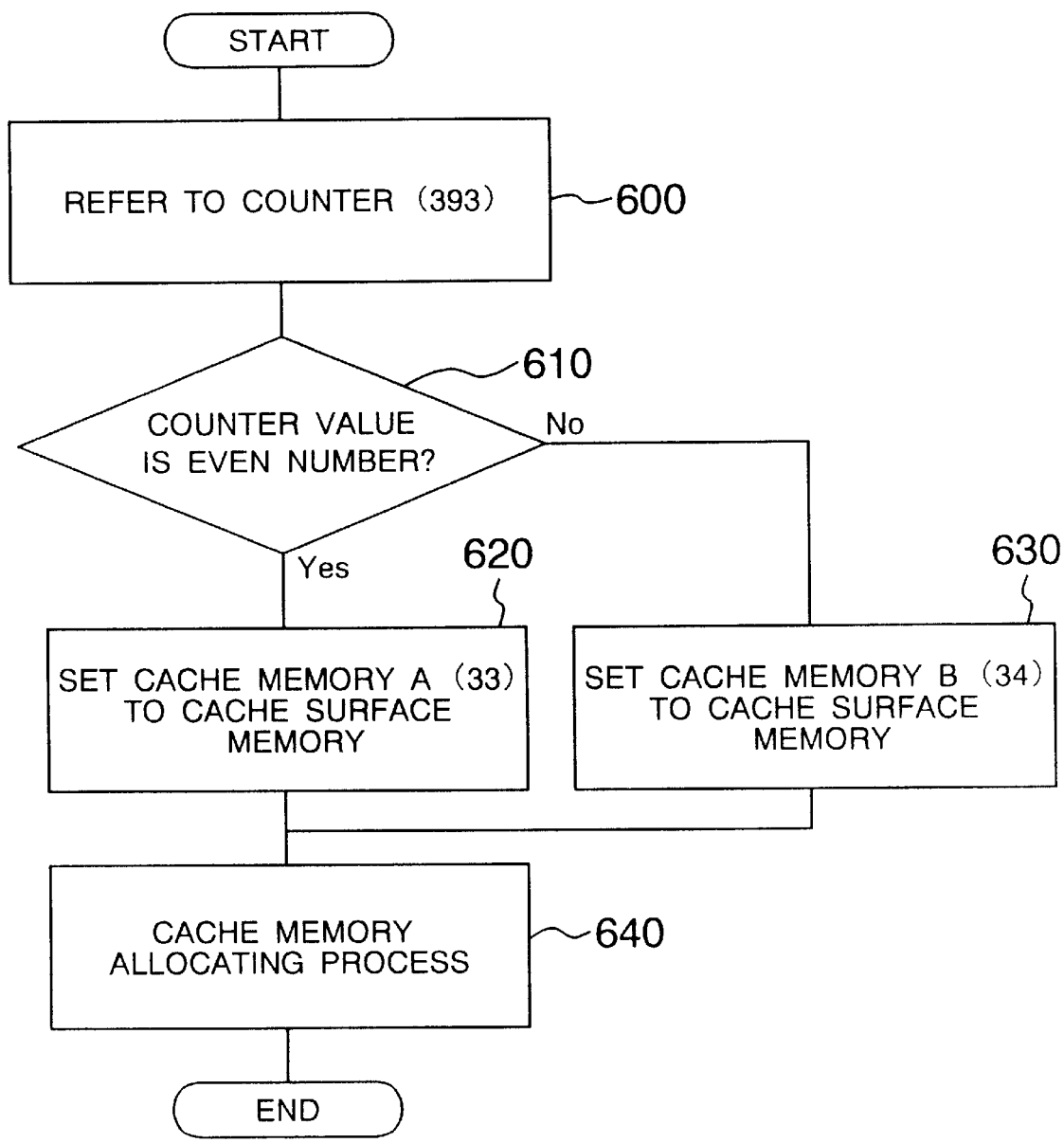
FIG. 6 shows an example of the selecting process of the cache surface.

FIG. 6 shows still another example of the cache memory selecting process of the cache surface. In step 600, the cache control unit 37 refers to a counter 393. In step 610, a determination is made to see if a counter value of the counter 393 is an even number or an odd number, and on the basis of the determination result, the cache surface cache memory A or B is selected (steps 620, 630). The cache memories are allocated in step 640.

Figure 7:
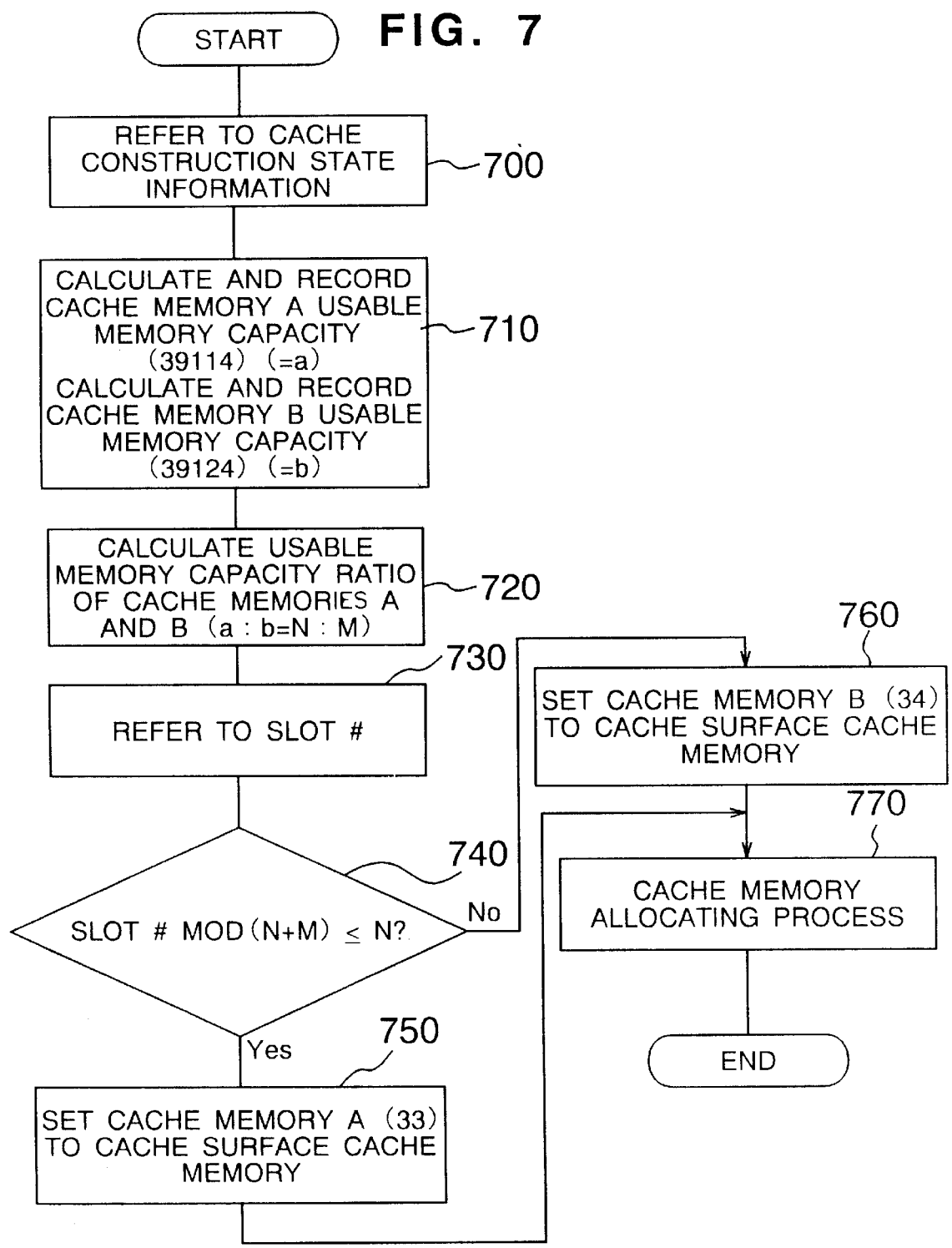
FIG. 7 shows an example of the selecting process of the cache surface.

FIG. 7 shows another example of the cache memory selecting process of the cache surface. The cache control unit 37 refers to the cache construction state information 392 (step 700). The usable.memory capacities 39114 and 39124 of the cache memories are calculated, respectively (step 710) and are recorded in the cache using state information 391. Subsequently, a usable memory capacity ratio of every cache memory surface is calculated (step 720). It is now assumed that the capacity ratio (cache memory A:cache memory B) is equal to N:M. In step 730, the slot number is referred to in a manner similar to the selecting process shown in FIG. 4. A remainder when the slot number is divided by (N+M) is obtained (step 740). When the remainder is equal to or less than N, the cache memory A is selected as a cache surface (step 750). In the other cases, the cache memory B is selected as a cache surface (step 760). In step 770, the cache memories are allocated. In the example, although the selection of the cache surface by the slot number has been shown, the selecting process by the counter value shown in FIG. 6 can also be used in steps 730 to 750.

The example of the selecting process of the cache memory of the cache surface has been shown above. In the embodiment, since only two cache memories are provided, the selecting process of the NVS surface is unnecessary. When providing N cache memories, however, the selecting process is also needed with respect to the selecting process of the NVS surface. In such a case, it will be obviously understood that the selecting process of the cache memory as a cache surface can be applied.

The memory control apparatus according to the invention can arbitrarily select the cache memory which is used as a cache surface or an NVS surface from among a 10 plurality of cache memories. Therefore, the using states of the cache memories can be preferably balanced and there is an effect such that the using efficiency of the space of the cache memory is improved.

We claim:

1. A memory control apparatus that needs to form parity data for a write-after operation and that needs to hold duplexed dirty data, interposed between a central processing unit and a memory device for storing data transferred between said central processing unit and said memory device, the memory control apparatus comprising:

a channel control unit for controlling said data transferred to/from said central processing unit;

a drive control unit for controlling said data transferred to/from said memory device;

a plurality of cache memories for temporarily storing said data;

a cache control unit for allocating one of said cache memories to said data to be stored in association with said data; and a control memory for storing state information of said plurality of cache memories;

wherein said cache control unit selects a first cache memory from said plurality of cache memories when specific data are read out from said memory device, stores said specific data into said first cache memory, selects a second cache memory from said plurality of cache memories when updating said specific data, suppresses a deviation of a used amount of each cache memory based on said storing state information, and stores updated data from said specific data into said first cache memory and said second cache memory.

2. A memory control apparatus that needs to form parity data for a write-after operation and that needs to hold duplexed dirty data, interposed between a central processing unit and a memory device for storing data transferred between said central processing unit and said memory device, the memory control apparatus comprising:

a channel control unit for controlling said data transferred to/from said central processing unit;

a drive control unit for controlling said data transferred to/from said memory device;

two groups of cache memories for temporarily storing said data;

a cache control unit for allocating one group of said cache memories to said data to be stored in association with a data transfer between said central processing unit and said memory device; and control memory for storing state information of said two groups of cache memories;

wherein said cache control unit selects a first cache memory from said two groups of cache memories when specific data are read out from said memory device, stores said specific data into said first cache memory, selects a second cache memory from said two groups of cache memories when updating specific data, suppresses a difference of a used amount of each group of cache memories based on said storing state information, and stores updated data from said specific data into said first cache memory and said second cache memory.

3. A cache allocating method for said cache control unit of a memory control apparatus according to claim 2, comprising the steps of:

a first step for referring to a first amount of said updated data in said one group of said cache memories and a second amount of said updated data in the other group of said cache memories;

a second step for comparing said first amount and said second amount; and a third step for allocating a smaller amount one of said cache memories to said data.

4. A cache allocating method for said cache control unit of a memory control apparatus according to claim 2, wherein said data those are temporarily stored in said cache memories, are managed as slots, said method comprising the steps of:

a first step for referring to said state information;

a second step for obtaining usable memory capacities of said two groups of said cache memories;

a third step for obtaining a ratio of one group of said cache memories, to their other group of said cache memories, and corresponding said ratio to N/M;

a fourth step for referring to a slot number of said data;

a fifth step for comparing N and a residue in case said slot number is divided by N+M; and a sixth step for allocating one group of said cache memories to said data if said residue is not bigger than N, or allocating the other group of said cache memories to said data if said residue is bigger than N.

5. A cache allocating method for said cache control unit of a memory control apparatus according to claim 2, wherein said data those are temporarily stored in said cache memories, are managed as slots, comprising the steps of:

a first step for referring to a slot number of said data;

a second step for deciding if said number is odd or even; and a third step for allocating one group of said cache memories to said data if said number is even, or allocating the other group of said cache memories to said data if said number is odd.

6. A cache allocating method for said cache control unit of a memory control apparatus according to claim 5, wherein said second step is achieved by referring to counter numerals corresponding to said slot.

* * * * *